United States Patent
Huang-Fu et al.

(10) Patent No.: US 11,071,043 B2
(45) Date of Patent: Jul. 20, 2021

(54) ENHANCED HANDLING ON FORBIDDEN PLMN LIST

(71) Applicant: MEDIATEK INC., Hsin-Chu (TW)

(72) Inventors: Chien-Chun Huang-Fu, Hsin-Chu (TW); Marko Niemi, Oulu (FI)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/408,729

(22) Filed: May 10, 2019

(65) Prior Publication Data

US 2019/0357116 A1   Nov. 21, 2019

Related U.S. Application Data

(60) Provisional application No. 62/674,316, filed on May 21, 2018.

(51) Int. Cl.
*H04W 84/04* (2009.01)
*H04W 8/20* (2009.01)
(Continued)

(52) U.S. Cl.
CPC .......... *H04W 48/04* (2013.01); *H04W 8/20* (2013.01); *H04W 8/245* (2013.01);
(Continued)

(58) Field of Classification Search
CPC ........... H04W 48/04; H04W 12/1204; H04W 12/1202; H04W 48/18; H04W 60/00;
(Continued)

(56) References Cited

U.S. PATENT DOCUMENTS

2012/0044869 A1\* 2/2012 Tiwari ................. H04W 48/18
370/328
2012/0178449 A1   7/2012 Liao .......................... 455/435.2
(Continued)

FOREIGN PATENT DOCUMENTS

EP      2475213 A2    1/2011
WO  WO2013174256 A1  5/2012

OTHER PUBLICATIONS

3GPP TS 24.008 V14.3.0 (Mar. 2017), 3rd Generation Partnership Project;Technical Specification Group Core Network and Terminals; Mobile radio interface Layer 3 specification;Core network protocols; Stage 3 (Release 14) (Year: 2017).\*
(Continued)

*Primary Examiner* — Moo Jeong
(74) *Attorney, Agent, or Firm* — Imperium Patent Works; Zheng Jin

(57) ABSTRACT

A method of enhanced handling of a Forbidden Public Land Mobile Network (PLMN) list is proposed. When a UE tries to attach to a PLMN and receives an ATTACH Reject message having no integrity protection, it could be transmitted from a network entity trying to block the PLMN for providing service. Therefore, by introducing a temporary forbidden PLMN list and a timer T3247, UE can avoid adding the PLMN ID to the Forbidden PLMN list and avoid being blocked for network access. Instead, UE is only temporary refrained from selecting the PLMN ID and is able to retry for the network access after T3247 expiry. The temporary list together with T3247 mechanism thus gives UE more opportunity to try with the same PLMN ID at a different time and/or a different UE location, where the malicious blocking is no longer available.

16 Claims, 4 Drawing Sheets

(51) Int. Cl.
  *H04W 60/00* (2009.01)
  *H04W 48/18* (2009.01)
  *H04W 48/04* (2009.01)
  *H04W 8/24* (2009.01)
  *H04W 76/25* (2018.01)
  *H04W 12/122* (2021.01)
  *H04W 60/04* (2009.01)
  *H04W 48/02* (2009.01)

(52) U.S. Cl.
  CPC ......... *H04W 12/122* (2021.01); *H04W 48/18* (2013.01); *H04W 60/00* (2013.01); *H04W 76/25* (2018.02); *H04W 84/042* (2013.01)

(58) Field of Classification Search
  CPC ....... H04W 76/25; H04W 8/245; H04W 8/20; H04W 84/042; H04W 60/04; H04W 48/02; H04W 12/122
  See application file for complete search history.

(56) References Cited

U.S. PATENT DOCUMENTS

| | | | |
|---|---|---|---|
| 2013/0316699 A1 | 11/2013 | Jheng et al. | 455/423 |
| 2016/0255674 A1 | 9/2016 | Niemi et al. | 455/435.1 |
| 2017/0094628 A1* | 3/2017 | Miao | H04W 36/08 |
| 2019/0053054 A1* | 2/2019 | Seshadri | H04L 63/101 |

OTHER PUBLICATIONS

3GPP TS 42.017 V4.0.0 (Mar. 2001), 3rd Generation Partnership Project; Technical Specification Group Terminals; Subscriber Identity Modules (SIM); Functional characteristics (Release 4) (Year: 2001).*

International Search Report and Written Opinion of International Search Authority for PCT/CN2019/087711 dated Aug. 16, 2019 (9 pages).

3GPP TSG-CT WG1 Meeting #101 C1-165420 (rev of C1-165385, C1-165025), Intel et al., "Correction of handling of reject due to lack of subscription", Reno, NV, USA, Nov. 14-18, 2016 (8 pages) *section 4.1.1.6A*.

* cited by examiner

ENHANCED HANDLING ON FORBIDDEN PLMN LIST

CROSS REFERENCE TO RELATED APPLICATIONS

This application claims priority under 35 U.S.C. § 119 from U.S. Provisional Application No. 62/674,316, entitled "Enhanced Handling on Forbidden PLMN List", filed on May 21, 2018, the subject matter of which is incorporated herein by reference.

TECHNICAL FIELD

The disclosed embodiments relate generally to wireless communication, and, more particularly, to method of enhanced handling of forbidden Public Land Mobile Network (PLMN) list in new radio (NR) systems.

BACKGROUND

A Public Land Mobile Network (PLMN) is a network established and operated by an administration or recognized operating agency (ROA) for the specific purpose of providing land mobile communication services to the public. PLMN provides communication possibilities for mobile users. A PLMN may provide service in one or a combination of frequency bands. A relationship exists between each subscriber and his home PLMN (HPLMN). If communications are handled over another PLMN, this PLMN is referred to as the visited PLMN (VPLMN). A PLMN area is the geographical area in which a PLMN provides communication services according to the specifications to mobile users. In the PLMN area, the mobile users can set up calls to other users of a terminating network. The terminating network may be a fixed network, the same PLMN, another PLMN or other types of PLMN. Terminating network users can also setup calls to the PLMN. The PLMN area is allocated to a PLMN, which is determined by the service provider.

Access to PLMN services is achieved by means of an air interface involving radio communications between mobile phones and base stations with integrated IP network services. One PLMN may include multiple radio access networks (RAN) utilizing different radio access technologies (RAT) for accessing mobile services. A radio access network is part of a mobile communication system, which implements a radio access technology. Conceptually, RAN resides between a mobile device and provides connection with its core network (CN). Depending on the standard, mobile phones and other wireless connected devices are varyingly known as user equipment (UE), terminal equipment, mobile stations (MS), etc. Examples of different RATs include 2G GERAN (GSM) radio access network, 3G UTRAN (UMTS) radio access network, 4G E-UTRAN (LTE), and 5G new radio (NR) radio access network.

When a mobile device is turned on, a network selection process starts, whereby candidate PLMNs are chosen, one at a time, for attempted registration. In GSM networks, when an MS is switched on, the International Mobile Subscriber Identity (IMSI) attach procedure is executed. The ISMI attach procedure is required for the MSC and VLR to register the MS in the network. Similarly, in 3G/4G/5G networks, when a UE is switched on, it searches for a mobile network to connect. Once the UE selects its desired network, it will try to attach to the network and attempts registration with the network. Typically, UE supports both manual and automatic network selection mechanisms.

To facilitate the network selection process, a UE may have an Operator Controlled PLMN Selector list and a User Controlled PLMN Selector list stored on the SIM/USIM card. Both PLMN Selector lists may contain a list of preferred PLMNs in priority order. A PLMN Selector list, including HPLMN, may have multiple occurrences, with different radio access technology identifies, e.g., NR, E-UTRAN, UTRAN, or GERAN. The UE may utilize all the information stored in the SIM/USIM related to network selection, e.g., HPLMN, Operator Controlled PLMN Selector list, User Controlled PLMN Selector list, and Forbidden PLMN list. If registration on a PLMN is successful, the UE indicates this PLMN ("the registered PLMN") and be capable of making and receiving calls on it. If registration is unsuccessful because the IMSI is unknown in the home network or the UE is illegal, then the UE does not allow any future registration attempts, until the UE is next powered-up or a SIM/USIM is inserted.

When a registration attempt by the UE is rejected by a network with an indication of "permanent" PLMN restriction, the PLMN identity is written to a list of "Forbidden PLMNs" stored in a data field in the SIM/USIM. If a successful registration is later achieved on a PLMN in the Forbidden PLMN list, then the PLMN is deleted from the list. The Forbidden PLMN list is used to avoid unnecessary registration attempts. For example, some networks may suffer severe network errors that cannot be resolved in short term. Depending on the underlying cause of the error, it may make no sense to continue to try to attach or register to the network. In that case, continuing to try will wastefully consume UE power and use system resources when there is no chance of success. In addition, some errors occurred in one of the networks may not occur in another network. As a result, reattempt in the network that occurs severe network error will delay the initiation of other recovery mechanism that can successfully restore service to the user.

According to the current 3GPP specification, when a UE tries to attach or register to a PLMN and receives a reject message, a PLMN ID of that PLMN is added to the list of "Forbidden PLMNs" in the SIM/USIM of UE when 1) the UE is not configured with timer T3245, 2) the reject message is not integrity-protected, 3) the UE maintains a list of PLMN-specific attempt counters, and 4) the value of the PLMN-specific attempt counter for that PLMN is less than the UE implementation specific maximum value. However, under this scenario, if the counter value is less than the maximum value, the PLMN ID will be selected again and the counter value will reach the maximum value easily. As a result, if the reject message is from a fake operator, then the PLMN ID will be added to the list of "Forbidden PLMNs" in the SIM/USIM of UE and the PLMN will become permanently unavailable to the UE for service.

A solution is sought.

SUMMARY

A method of enhanced handling of a Forbidden Public Land Mobile Network (PLMN) list is proposed. When a UE tries to attach to a PLMN and receives a reject message, the following scenario may occur: 1) the UE is not configured with timer T3245, 2) the reject message is not integrity-protected, 3) the UE maintains a list of PLMN-specific attempt counters, and 4) the value of the PLMN-specific attempt counter for that PLMN is less than a maximum attempt value. Under such scenario, UE starts a T3247 timer and adds a PLMN ID of that PLMN to a temporary list of "Forbidden PLMNs" in the UE memory. The temporary forbidden PLMN list, e.g., is an extension of the Forbidden PLMN list. UE is refrained from retrying the attach procedure with the same PLMN ID that is added to the temporary forbidden PLMN list. Later on, after timer T3247 expires, UE removes the PLMN ID from the temporary forbidden PLMN list and is then allowed to select the same PLMN ID for network access attempt.

Note that When a UE tries to attach to a PLMN and receives a reject message having no integrity protection, the reject message could be transmitted from a network entity trying to block the PLMN for providing service. Therefore, if an ATTACH Reject is faked by a network entity, by introducing a temporary forbidden PLMN list and a timer T3247, UE can avoid adding the PLMN ID to the Forbidden PLMN list and avoid being blocked for network access. Instead, UE is only temporary refrained from selecting the PLMN ID and is able to retry for the network access after T3247 expiry. The temporary forbidden PLMN list together with the T3247 timer mechanism thus gives UE more opportunity to try with the same PLMN ID at a different time and/or a different UE location, where the malicious blocking is no longer available.

In one embodiment, a UE registers or attaches to a mobile communication network having a Public Land Mobile Network (PLMN) ID. The UE receives a reject message from the network. The reject message has no integrity protection. The UE starts a timer and adding the PLMN ID to an extension of a Forbidden PLMN list. The UE refrains from registering or attaching to the mobile communication network having the PLMN ID while the PLMN ID is stored in the extension of the Forbidden PLMN list. The UE removes the PLMN ID from the extension of the Forbidden PLMN list upon timer expiry. The UE is allowed to attach to the network having the PLMN ID.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
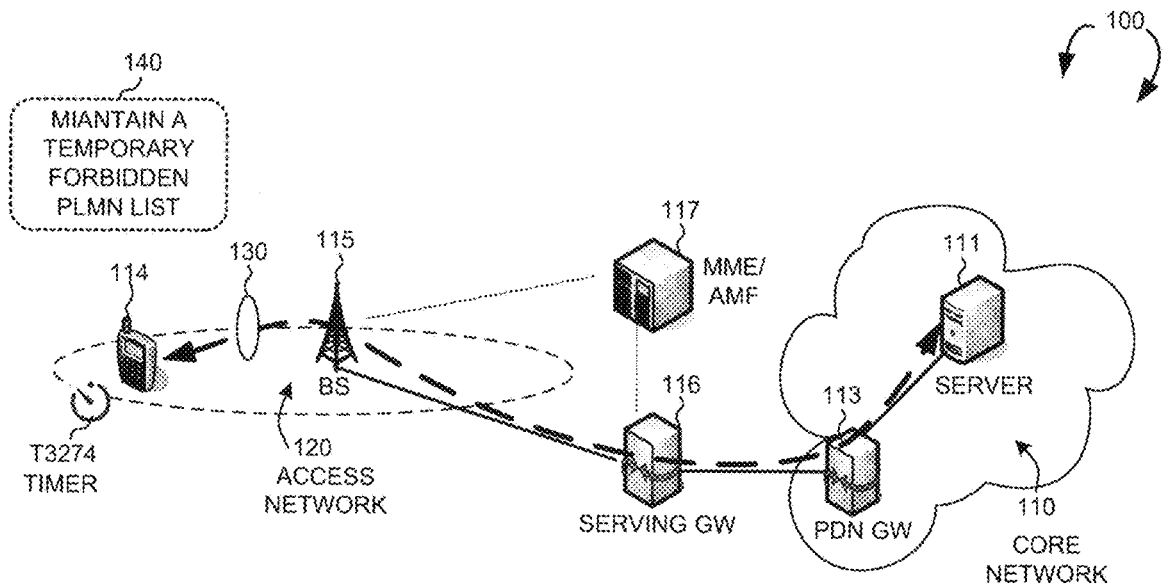
FIG. 1 schematically shows a Public Land Mobile Network (PLMN) having a core network and a radio access networks (RAN) supporting enhanced forbidden PLMN list in accordance with one novel aspect.

FIG. 1 schematically shows a Public Land Mobile Network (PLMN) 100 having a core network 110 and a radio access networks (RAN) 120 supporting enhanced forbidden PLMN list in accordance with one novel aspect. PLMN network 100 comprises application server 111 that provides various services by communicating with a plurality of user equipments (UEs) including UE 114. In the example of FIG. 1, application server 111 and a packet data network gateway (PDN GW or P-GW) 113 belong to part of a core network CN 110. UE 114 and its serving base station BS 115 belong to part of a radio access network RAN 120. RAN 120 provides radio access for UE 114 via a radio access technology (RAT). Application server 111 communicates with UE 114 through PDN GW 113, serving GW 116, and BS 115. A mobility management entity (MME) or an access and mobility management function (AMF) 117 communicates with BS 115, serving GW 116 and PDN GW 113 for access and mobility management of wireless access devices in LTE/NR network 100. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

When a UE is switched on, it searches for a network to connect. Once the UE selects the desired network, it will try to attach to the network and attempt registration with the network. To facilitate the network selection process, the UE may have an operator-controlled PLMN selector list and a user-controlled PLMN selector list stored on the subscriber identity module (SIM) or universal SIM (USIM) card. The SIM/USIM securely stores the international mobile security identity (IMSI) and other related keys used to identify and authenticate subscribers on mobile telephone devices. The UE may utilize all the information stored in the SIM/USIM related to network selection, e.g., HPLMN, operator-controlled PLMN selector list, user-controlled PLMN selector list, and forbidden PLMN list. If registration on a PLMN is successful, UE indicates this PLMN ("the registered PLMN") and be capable of making and receiving calls on it. When a registration attempt on a PLMN is rejected by a network, the PLMN ID is written to a list of forbidden PLMNs stored in a data field on the SIM/USIM. If a successful registration is achieved on a PLMN in the forbidden PLMN list, then the PLMN ID is removed from the list.

The forbidden PLMN list is to avoid unnecessary registration attempts. According to the current 3GPP specification, when a UE tries to attach or register to a PLMN and receives a reject message, a PLMN ID of that PLMN is added to the list of "Forbidden PLMNs" in the SIM/USIM of UE when 1) the UE is not configured with timer T3245, 2) the reject message is not integrity-protected, 3) the UE maintains a list of PLMN-specific attempt counters, and 4) the value of the PLMN-specific attempt counter for that PLMN is less than the UE implementation specific maximum value. However, under this scenario, if the counter value is less than the maximum value, the PLMN ID will be selected again and the counter value will reach the maximum value easily. As a result, if the reject message is from a fake operator, then the PLMN ID will be added to the list of "Forbidden PLMNs" in the SIM/USIM of UE and the actual PLMN having the PLMN ID will become permanently unavailable to the UE for service.

In accordance with one novel aspect, a method of enhanced handling of a Forbidden PLMN list is proposed. In the example of FIG. 1, UE 114 selects a network having a PLMN ID, and tries to attach to the network and attempts registration with the network to establish a PDN connection or a PDU session 130. However, UE 114 receives an attach reject message, but the reject message has no integrity protection and therefore could be transmitted from a fake network entity. UE 114 maintains a PLMN-specific attempt counter and a maximum attempt value. If the attempt counter value has not reached the maximum attempt value, instead of retry the attach procedure with the same PLMN ID, UE 114 starts a timer (e.g., timer T3247) and adds the PLMN ID to a temporary forbidden PLMN list as depicted by 140, e.g., an extension of the Forbidden PLMN list. The extension of the Forbidden PLMN list is a temporary list and can be added to UE's internal memory. UE 114 is then refrained from retrying the attach procedure with the same PLMN ID that is added to the temporary forbidden PLMN list. Later on, after timer T3247 expires, UE 114 removes the PLMN ID from the temporary forbidden PLMN list and UE 114 is then allowed to select the same PLMN ID for network access attempt. The reasoning is that upon T3247 expiry, UE 114 may have moved to a different location not covered by the fake network entity. Therefore, if a PLMN ID is faked by a malicious network entity, by introducing a new extension of the Forbidden PLMN list, UE can avoid adding the PLMN ID to the Forbidden PLMN list and not able to gain network access. Instead, UE is only temporary refrained from selecting the PLMN ID and is able to retry for the network access after T3247 expiry.

Figure 2:
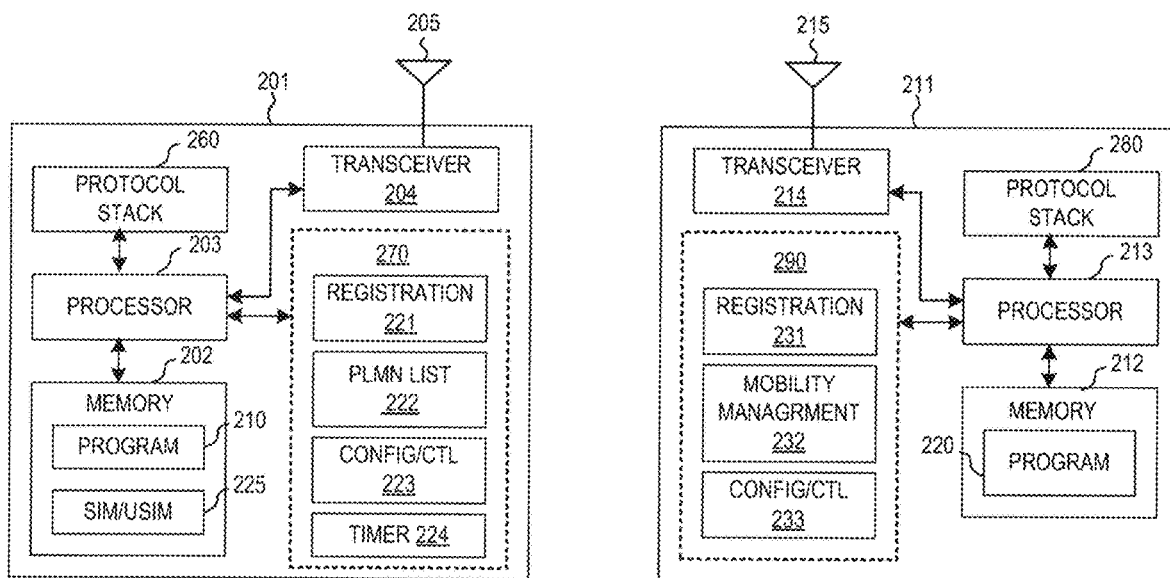
FIG. 2 illustrates simplified block diagrams of a user equipment and a network entity in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. Registration circuit 231 handles registration procedure. Mobility management circuit 232 handles mobility management functionalities. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise registration circuit 221 that performs registration procedure with the network, a PLMN list maintenance circuit 222 that handles the adding, removing, and resetting of one or more forbidden PLMN lists in SIM/USIM and/or in UE memory, a config and control circuit 223 that handles configuration and control parameters, and timer 224 implements timer to be used for maintaining the PLMN list. Note that the network selection and registration related information, such as HPLMN, Operator Controlled PLMN Selector list, User Controlled PLMN Selector list, and Forbidden PLMN list, may be stored in SIM/USIM 225. On the other hand, the temporary or extension of the Forbidden PLMN list may be temporary stored in UE memory.

Figure 3:
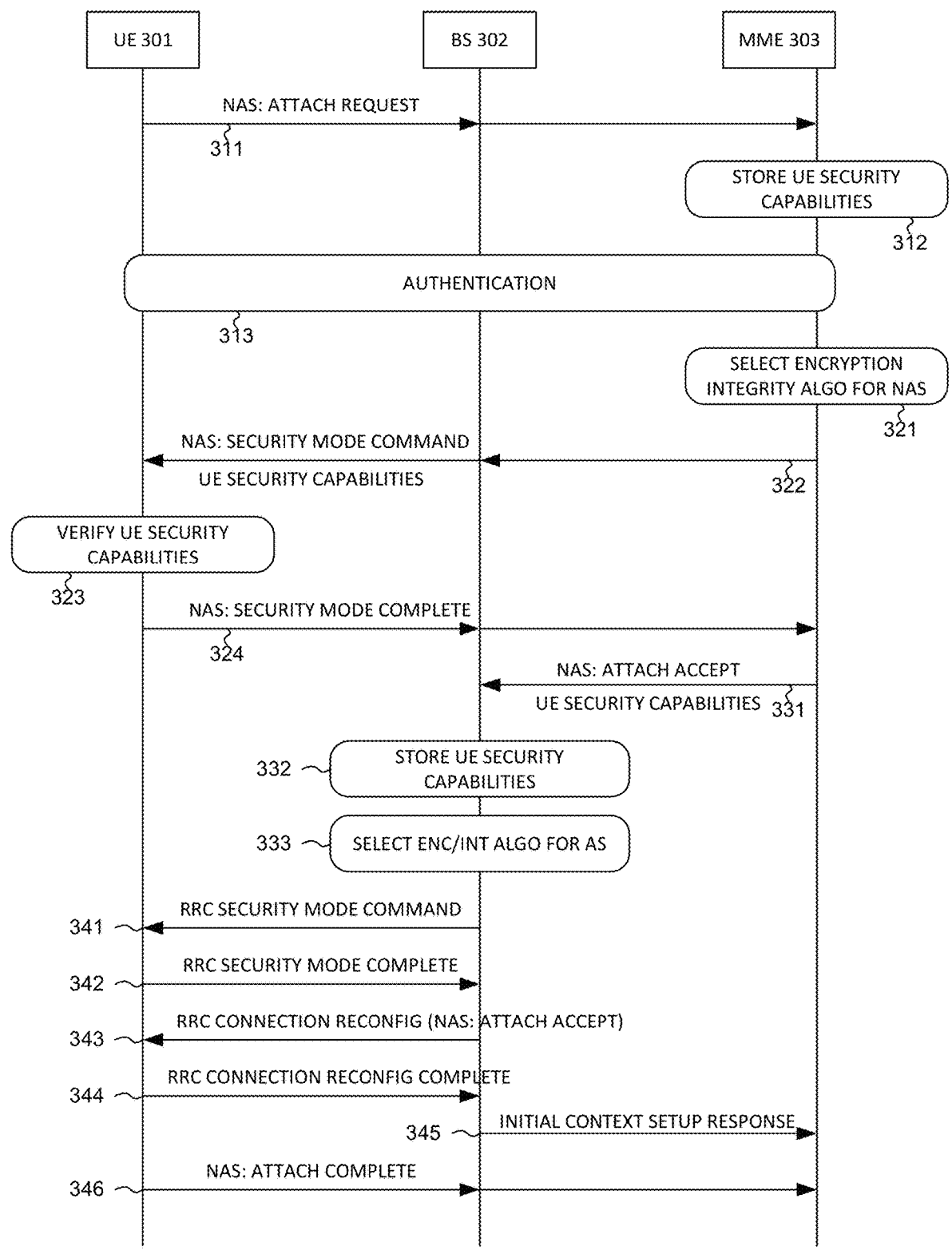
FIG. 3 illustrates an attach procedure with security protection for both NAS layer and AS layer connections.

FIG. 3 illustrates an attach procedure with security protection for both NAS layer and AS layer connections. In step 311, UE 301 selects a PLMN and sends a NAS ATTACH request message with UE network capability to BS 302 and MME 303. In step 312, MME 303 stores UE security capabilities. In step 313, UE 301 and the network performs authentication. In step 321, MME 303 selects encryption and integrity algorithms for NAS layer security. In step 322, MME 303 sends NAS security mode command to UE 301. The command comprises UE security capabilities including Cipher algorithm ID and Integrity algorithm ID. In step 323, UE 301 verifies the UE security capabilities. In step 324, UE 301 sends a NAS security mode complete message to BS 302 and MME 303. After this, the NAS layer connection is protected.

In step 331, MME 303 sends a NAS ATTACH accept message with UE security capabilities to BS 302. In step 332, BS 302 stores the UE security capabilities. In step 333, BS 302 selects the encryption and integrity algorithms for AS layer security. In step 341, BS 302 sends an RRC security mode command to UE 301. In step 342, UE 301 sends an RRC security mode complete message to BS 302. After this, the AS layer connection protected. In step 343, BS 302 sends an RRC connection reconfiguration carrying NAS ATTACH accept to UE 301. In step 344, UE 301 sends an RRC connection reconfiguration complete message to BS 302. In step 345, BS 302 sends an initial context setup response to MME 303. In step 346, UE 301 sends a NAS ATTACH complete message to BS 302 and MME 303. In the example of FIG. 3, after the SMC (security mode command and security mode complete) procedure, the NAS layer and AS layer connection are protected, e.g., the messages exchanged between UE and the network are encrypted by certain ciphering and integrity algorithm for authentication and security. However, under certain scenarios, NAS messages are not integrity protected.

Figure 4:
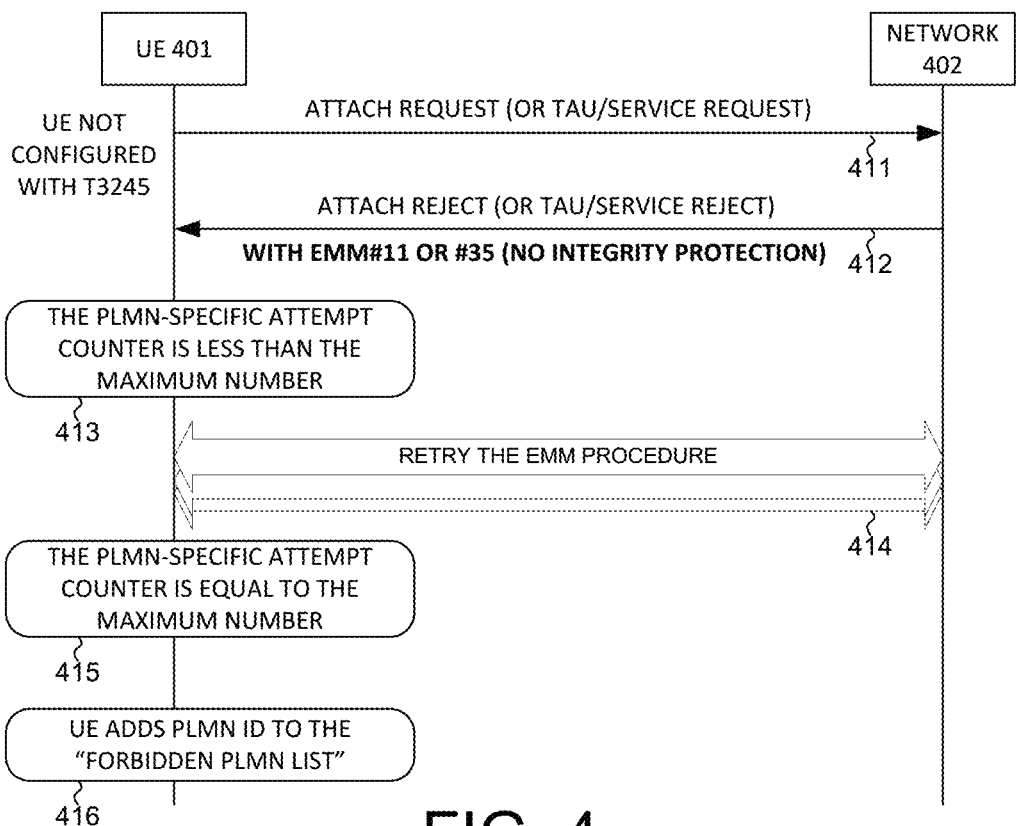
FIG. 4 illustrates a first embodiment of an attach procedure and adding PLMN ID to a forbidden PLMN list under certain scenarios.

FIG. 4 illustrates a first embodiment of an attach procedure and adding PLMN ID to a Forbidden PLMN list under certain scenarios. In step 411, UE 401 selects a PLMN and tries to attach to the PLMN by sending an ATTACH Request message (or a TAU/service Request message) to network 402. Due to a network failure, the attachment is rejected by the network. In step 412, UE 401 receives an ATTACH Reject message (or a TAU/service Reject message) with error code, e.g., EMM #11 for PLMN not allowed, and EMM #35 for requested service option not authorized in the PLMN. Upon receiving the ATTACH Reject message and the error cause, in step 413, UE 401 increments a PLMN-specific attempt counter. UE 401 checks whether the counter value is less than a maximum attempt number. If so, then in step 414, UE 401 selects the same PLMN again and tries to attach to the PLMN by sending an ATTACH Request to the network. Step 414 can be repeated many times as long as the PLMN-specific attempt counter value is less than the maximum attempt number. In step 415, UE 401 determines that the counter value is equal to the maximum attempt number. As a result, in step 416, UE 401 adds the PLMN ID to the "Forbidden PLMN list". Once a PLMN ID is stored in the Forbidden PLMN list, the UE is no longer allowed to attach to the same PLMN until such entry is removed from the list. Note that in the embodiment of FIG. 4, UE 401 is not configured to use timer T3245, which is a different mechanism for maintaining the Forbidden PLMN list. If T3245 is configured, then UE 401 will start T3245 after it receives the ATTACH Reject message in step 413.

In one specific scenario, network 402 is a fake network entity trying to block the PLMN to provide service to UEs. Under such case, in step 412, the ATTACH Reject message sent from network 402 is not integrity protected. If UE 401 ignores that such reject message has no integrity protection, follows steps 413-414, and keeps retrying to attach to the same PLMN ID, then the counter value will be incremented every time and reach the maximum attempt number quickly. As a result, the PLMN ID will be added to the Forbidden PLMN list and becomes unavailable to UE 401. Therefore, UE 401 needs to check whether the ATTACH Reject message has integrity protection. If the ATTACH Reject message has no integrity protection, then UE 401 can use a temporary forbidden PLMN list to solve the problem of malicious blocking.

Figure 5:
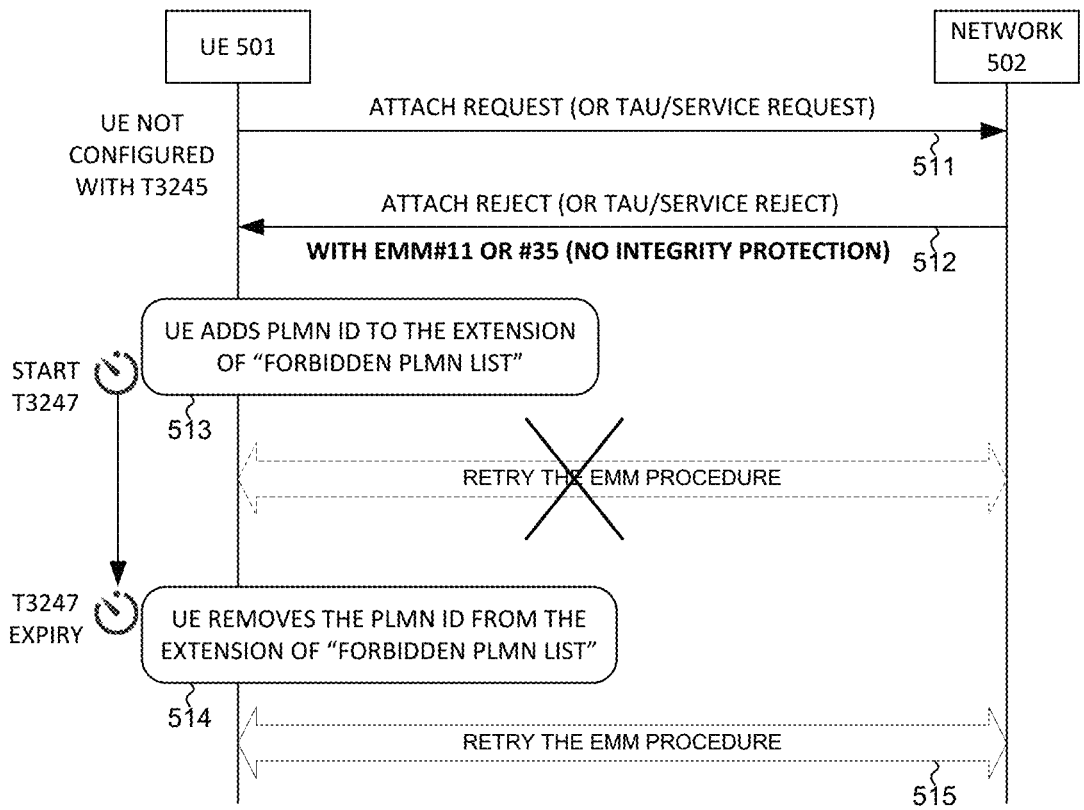
FIG. 5 illustrates a second embodiment of an attach procedure and adding PLMN ID to an extension of a forbidden PLMN list under certain scenarios.

FIG. 5 illustrates a second embodiment of an attach procedure and adding PLMN ID to an extension of a forbidden PLMN list under certain scenarios. In the embodiment of FIG. 5, UE 501 is also not configured to use timer T3245. In step 511, UE 501 selects a PLMN and tries to attach to the PLMN by sending an ATTACH Request message (or a TAU/service request) to network 502. Due to a network failure, the attachment is rejected by the network. In step 512, UE 501 receives an ATTACH Reject message (or a TAU/service Reject message) with error code, e.g., EMM #11 for PLMN not allowed, and EMM #35 for requested service option not authorized in the PLMN. Upon receiving the ATTACH Reject message and the error cause, in step 513, UE 501 increments a PLMN-specific attempt counter, and also determines whether the ATTACH Reject message has integrity protection. If no integrity protection, UE 501 starts a timer, e.g., timer T3247. UE 501 also adds the PLMN ID to a temporary forbidden PLMN list, e.g., an extension of the Forbidden PLMN list as long as the counter value is less than a maximum attempt number. UE 501 is then refrained from selecting the same PLMN ID to retry the attach procedure. In step 514, timer T3247 expires. UE 501 then removes the PLMN ID from the extension of the Forbidden PLMN list. In step 515, UE 501 is allowed to select the same PLMN ID and retry the attach procedure for network access. Because the PLMN ID is added to the temporary forbidden PLMN list when T3247 starts and is removed from the temporary forbidden PLMN list when T3247 expires, it is unlikely that the PLMN-specific attempt counter value will reach the maximum attempt number quickly. Therefore, this temporary list together with T3247 mechanism gives UE more opportunity to try with the same PLMN ID at a different time and/or at a different UE location, where the malicious blocking may no longer be available.

The timer value may be configured in different ways. For example, the timer value may be decided by the network associated with a PLMN and the error code. On the other hand, the UE may determine the timer value itself based on the PLMN and the error code. For example, the UE interprets the error code and determine a longer timer value for a more severe network failure. The UE may retrieve the timer value from its SIM/USIM card. In one example, the UE derives the timer value based on information stored in the SIM/USIM card. In addition, the timer value may be dynamically adjusted by a message received from the network or by a predefined triggering event detected by the UE. The triggering event may be a manual selection of PLMN by the mobile user. The triggering event may also be a detected location change of the UE. By introducing a dynamically adjustable timer value for each PLMN entry in the network forbidden list, the network/UE is able to make effective and efficient decision on network selection and thus enhance service recovery performance.

Figure 6:
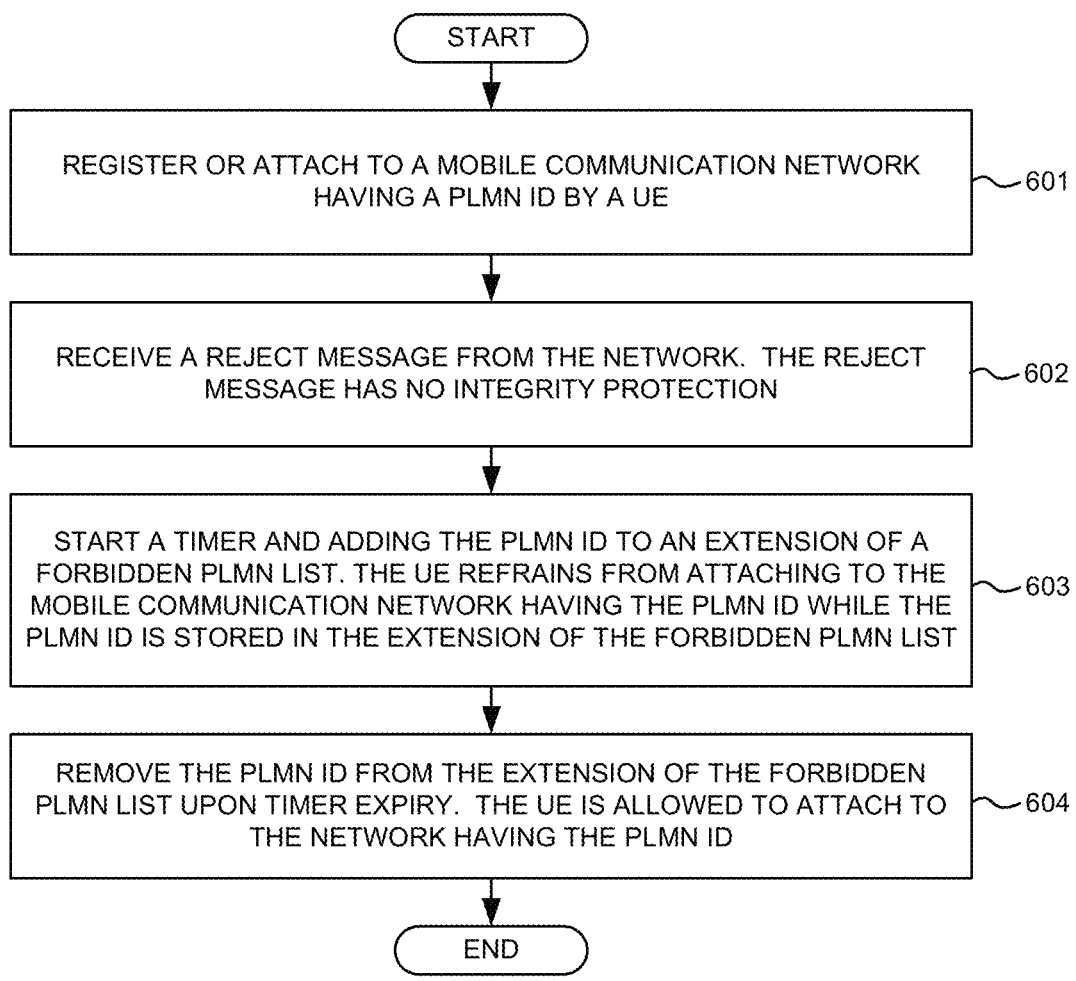
FIG. 6 is a flow chart of a method supporting enhanced handling on forbidden PLMN list in accordance with one novel aspect.

FIG. 6 is a flow chart of a method supporting enhanced handling on forbidden PLMN list in accordance with one novel aspect. In step 601, a UE registers or attaches to a mobile communication network having a Public Land Mobile Network (PLMN) ID. In step 602, the UE receives a reject message from the network. The reject message has no integrity protection. In step 603, the UE starts a timer and adding the PLMN ID to an extension of a Forbidden PLMN list. The UE refrains from attaching to the mobile communication network having the PLMN ID while the PLMN ID is stored in the extension of the Forbidden PLMN list. In step 604, the UE removes the PLMN ID from the extension of the Forbidden PLMN list upon timer expiry. The UE is allowed to attach to the network having the PLMN ID.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method performed by a user equipment (UE), comprising:

registering or attaching to a mobile communication network having a Public Land Mobile Network (PLMN) ID;

receiving a reject message from the network, wherein the reject message has no integrity protection;

starting a timer upon receiving the reject message and adding the PLMN ID to an extension of a Forbidden PLMN list in response to determining that the Forbidden PLMN list does not include the PLMN ID, wherein, while the timer is running, the UE refrains from registering or attaching to the mobile communication network having the PLMN ID while the PLMN ID is stored in the extension of the Forbidden PLMN list, wherein the extension is a temporary Forbidden PLMN list that is a separate and an independent list from the Forbidden PLMN list and is stored in an internal volatile memory of the UE, and wherein the Forbidden PLMN list comprises one or more PLMN IDs stored in a subscriber identity module (SIM) or a universal subscriber identity module (USIM); and removing the PLMN ID from the extension of the Forbidden PLMN list upon timer expiry.

2. The method of claim 1, wherein the timer is a predefined T3247 timer for a purpose of the extension of a Forbidden PLMN list operation.

3. The method of claim 1, wherein the UE is not configured with a T3245 timer for a purpose of a Forbidden PLMN list operation.

4. The method of claim 1, wherein the UE maintains a PLMN attempt counter and a maximum attempt value.

5. The method of claim 4, wherein the UE adds the PLMN ID to the extension of the Forbidden PLMN list when the PLMN attempt counter has not reached the maximum attempt value.

6. The method of claim 4, wherein the UE receives a second reject message from the network, wherein the second reject message is integrity protected.

7. The method of claim 6, wherein the UE increments the PLMN attempt counter and adds the PLMN ID to the Forbidden PLMN list when the PLMN attempt counter reaches the maximum attempt value.

8. The method of claim 1, wherein the reject message is a registration reject, an attach reject, a tracking area update (TAU) reject, or a service reject message.

9. A user equipment (UE), comprising:
a network access handling circuit that registers or attaches to a mobile communication network having a Public Land Mobile Network (PLMN) ID;
a receiver that receives a reject message from the network, wherein the reject message has no integrity protection;
a timer that is started upon receiving the reject message, wherein, while the timer is running, the UE adds the PLMN ID to an extension of a Forbidden PLMN list in response to determining that the Forbidden PLMN list does not include the PLMN ID, wherein the UE refrains from registering or attaching to the mobile communication network having the PLMN ID while the PLMN ID is stored in the extension of the Forbidden PLMN list, wherein the extension is a temporary Forbidden PLMN list that is a separate and independent list from the Forbidden PLMN list and is stored in an internal volatile memory of the UE, and wherein the Forbidden PLMN list comprises one or more PLMN IDs stored in a subscriber identity module (SIM) or a universal subscriber identity module (USIM); and
a forbidden PLMN list handling circuit that removes the PLMN ID from the extension of the Forbidden PLMN list upon timer expiry.

10. The UE of claim 9, wherein the timer is a predefined T3247 timer for a purpose of the extension of a Forbidden PLMN list operation.

11. The UE of claim 9, wherein the UE is not configured with a T3245 timer for a purpose of a Forbidden PLMN list operation.

12. The UE of claim 9, wherein the UE maintains a PLMN attempt counter and a maximum attempt value.

13. The UE of claim 12, wherein the UE adds the PLMN ID to the extension of the Forbidden PLMN list when the PLMN attempt counter has not reached the maximum attempt value.

14. The UE of claim 12, wherein the UE receives a second reject message from the network, wherein the second reject message is integrity protected.

15. The UE of claim 14, wherein the UE increments the PLMN attempt counter and adds the PLMN ID to the Forbidden PLMN list only when the PLMN attempt counter reaches the maximum attempt value.

16. The UE of claim 9, wherein the reject message is a registration reject, an attach reject, a tracking area update (TAU) reject, or a service reject message.

* * * * *